United States Patent

[11] 3,582,815

| [72] | Inventor | Larry D. Siebert |
| | | Ann Arbor, Mich. |
| [21] | Appl. No. | 739,227 |
| [22] | Filed | June 24, 1968 |
| [45] | Patented | June 1, 1971 |
| [73] | Assignee | Conductron Corporation |
| | | Ann Arbor, Mich. |
| | | Continuation-in-part of application Ser. No. 690,620, Dec. 14, 1967. |

[54] LASER LIGHT SOURCE
12 Claims, 5 Drawing Figs.

| [52] | U.S. Cl. | 331/94.5 |
| [51] | Int. Cl. | H01s 3/00 |
| [50] | Field of Search | 331/94.5 |

[56] References Cited

UNITED STATES PATENTS

| 3,358,243 | 12/1967 | Collins et al. | 331/94.5 |
| 3,369,192 | 2/1968 | Koester | 331/94.5 |
| 3,395,606 | 8/1968 | Niell | 331/94.5X |
| 3,426,293 | 2/1969 | Snitzer | 331/94.5 |
| 3,470,492 | 9/1969 | Soffer et al. | 331/94.5 |

OTHER REFERENCES

Daneu et al., " Single Transverse & Longitudinal Mode Q-Switched Ruby Laser," IEEE J.Q.E., Vol. Q.E.2, No. 8, Pgs. 290— 293, Aug. 1966.

Hercher, " Single-Mode Operation of a Q-Switched Ruby Laser," App. Phys. Ltrs. Vol. 7, No. 2, Pgs. 39— 41, July 15, 1966.

McClung et al., " Longitudinal Mode Control in Giant Pulse Lasers," IEEE J.Q.E., Vol. Q.E.1, Pgs. 94— 99, May 1965.

DeMaria, et al., " Self Mode-Locking of Lasers With Saturable Absorbers," App. Phys. Ltrs., Vol. 8, No. 7, Apr. 1, 1966, Pgs. 174— 176.

*Primary Examiner*—Ronald L. Wibert
*Assistant Examiner*—T. Major
*Attorney*—Barnes, Kisselle, Raisch and Choate

ABSTRACT: This invention relates to improvements in cavity configurations for a single axial and transverse mode of operation of a solid state laser. This invention utilizes mirrors, optical filters, an aperture and a saturable absorber to achieve a single axial and transverse mode of operation.

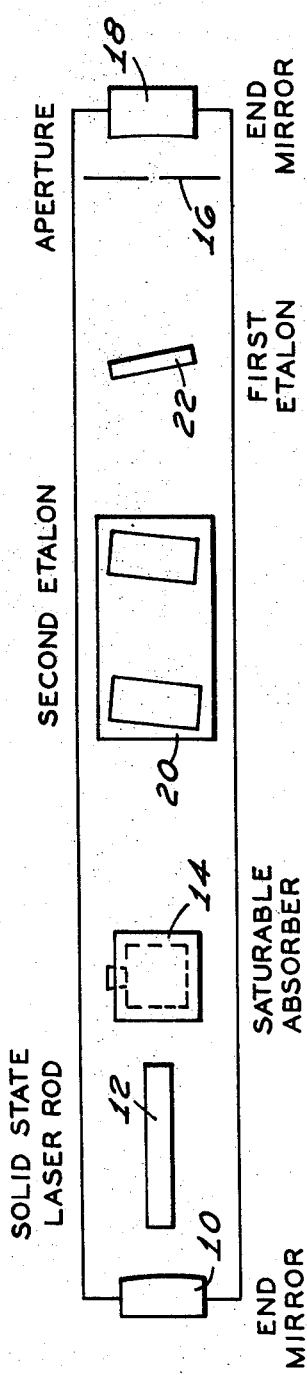
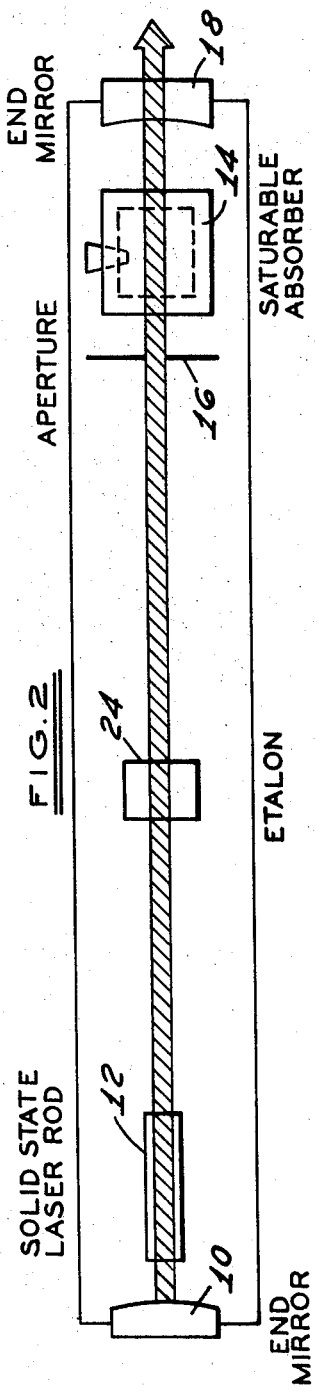

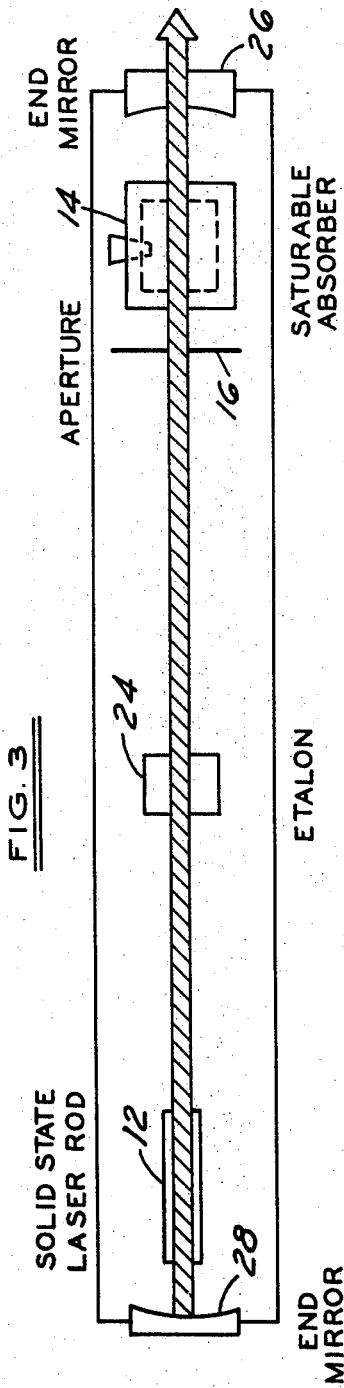
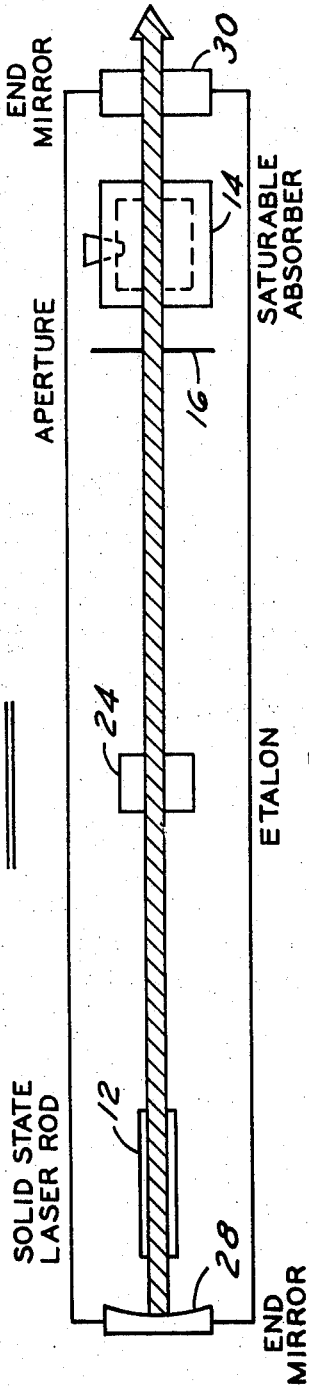
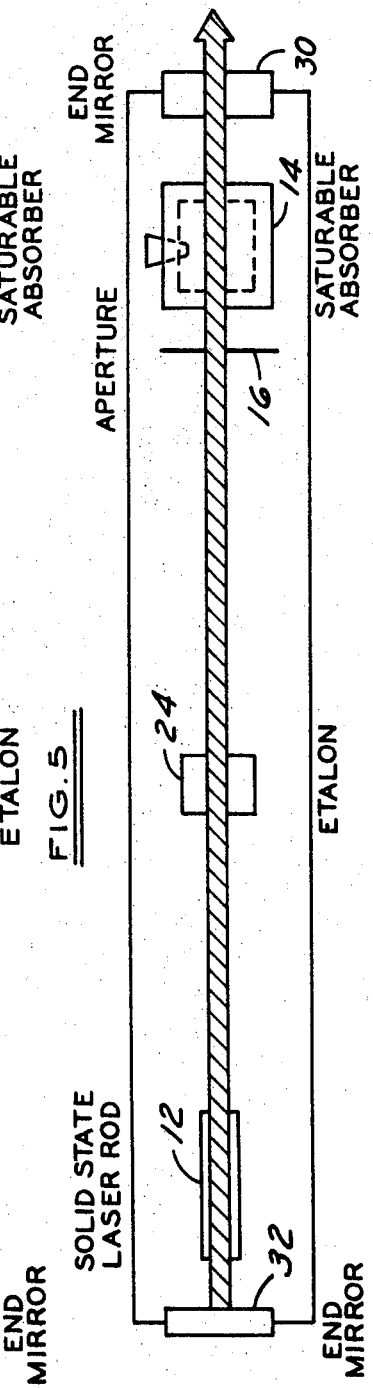
INVENTOR
LARRY D. SIEBERT

LASER LIGHT SOURCE

CROSS-REFERENCE TO A RELATED APPLICATION

This is a continuation-in-part of application Ser. No. 690,620, filed Dec. 14, 1967.

BACKGROUND OF THE INVENTION

This invention relates to improvements in laser light sources and more particularly to a cavity configuration for a pulsed solid-state laser light source which operates in a single axial and transverse mode.

Atoms can contain only certain discrete amounts of interval energy; hence, they can exist only in certain discrete energy levels and normally will reside in the lowest energy level. However, an atom can gain energy and exist at a higher level or become excited by absorbing a photon of light. According to the quantum theory, light is composed of small units of energy called photons. Once it is excited, one of the ways in which an atom can lose energy is by a process called stimulated emission. An excited atom can be stimulated to emit a photon of energy if another photon of energy strikes the atom. As a result of this striking, two identical photons of energy will leave the atom which will then reside at a lower energy state.

A pulsed solid-state laser is believed to emit photons of energy as light by the stimulated emission process. A ruby rod is composed of crystalline aluminum oxide containing a small amount of chromium. The chromium atoms are responsible for the emission of light from the ruby rod. The chromium atoms are raised to a higher energy level by intense irradiation of the ruby rod with light; this process is called pumping and is usually accomplished with a light source called a flash lamp coil.

Normally the stimulated emission of photons from a pumped ruby rod is in all directions. Hence, highly reflecting mirrors are placed at both ends of the ruby rod to provide a resonator or long path to send photons of light back and forth through the ruby rod. This causes many of the excited chromium atoms to be stimulated to emit photons in a specific direction producing a beam of light along the path of the mirrors. The photons of light are emitted from the ruby rod along the path of the mirrors because the energy loses in the resonator or cavity are smaller along this path than any other path through the ruby rod in the cavity. One of the mirrors is slightly transparent to allow the beam of light to be emitted from the resonator.

The output of a ruby laser rod has a narrow frequency spread which makes the light beam very monochromatic. However, closer examination of the light beam reveals that it is composed of several sharp sub-bands or axial modes having a very narrow frequency range which are spaced by frequency intervals that are functions of the spacing of the reflecting surfaces in the resonator. If only one of these sharp sub-bands or axial modes of light could be selected for transmission from the resonator, the frequency spread of the laser rod light beam would be substantially narrowed and the usefulness of the light beam in making front lighted holograms and other situations requiring a highly monochromatic light source would be improved.

The intensity pattern in a transverse plane or cross section of a laser light beam is dependent on the resonator cavity configuration in which the ruby rod is located. If the intensity pattern of a laser light beam is Gaussian or bell-shaped, the laser light source producing the beam of light is said to be operating in the fundamental or single transverse mode. A light beam with such an intensity pattern is useful in making front lighted holograms because a highly concentrated and intense light beam enables the making of holograms of moving objects.

A pulsed or intermittent solid state laser is used to produce an extremely powerful flash of light. In such a laser, it is necessary to use a system of mirrors that does not reflect light while the crystal rod is being pumped or excited. When the mirror system suddenly becomes reflective, all of the energy stored in the crystal rod by the pumping process is emitted in a brief flash. One means of controlling the reflectivity of the mirror system is to interpose a saturable absorber between the mirrors. The saturable absorber contains a dye that substantially reduces the transmission of light at low energy levels and becomes highly transparent when it has absorbed sufficient energy.

This invention discloses a resonator or cavity configuration of a pulsed solid state laser light source which operates in a combined single transverse and single axial modes. This device uses an etalon-type of interference band-pass optical filter to provide a stable single axial mode of operation and a saturable absorber and an aperture to provide a stable single transverse mode of operation.

The prior art references known to the inventor are:

F. J. McClung and D. Wiener, "Longitudinal Mode Control in Giant Pulse Lasers," IEEE Journal of Quantum Electronics, Vol. QE-1, pp. 94—99, May 1965; and V. Daneu, C. A. Sacchi and O. Svelto, "9C1-Single Transverse and Longitudinal Mode Q-Switched Ruby Laser, "IEEE Journal of Quantum Electronics, Vol. QE-2, No. 8, pp. 290—293, Aug. 1966

The McClung et al. article briefly discusses a method of producing a single axial mode of laser operation by the use of a rotating prism and flat parallel mirrors. The Daneu et al. article briefly discusses a configuration for producing a single axial mode of operation and seems to indicate that the cavity configuration disclosed in the article is not completely stable. In view of the improved stability of this invention and the differences in the cavity configuration between the references and this invention, the references do not disclose or anticipate a device which provides both a single transverse and axial highly stable mode of pulsed laser operation.

DESCRIPTION OF THE INVENTION

This invention relates to laser light sources and more particularly to a cavity configuration of a solid-state pulsed laser light source.

A principal object of this invention is to provide a pulsed solid-state laser light source which operates in a single transverse and axial mode.

Another object of this invention is to provide a pulsed solid-state laser light source which operates with improved stability in a single transverse and axial mode.

Another object of this invention is to provide a pulsed solid-state laser light source which operates in a single transverse and axial mode with increased power output and improved efficiency.

Another object of this invention is to provide a cavity configuration for a pulsed solid-state laser which does not require an optical filter with a dielectric coating to operate in a single transverse and axial mode.

Other objects and features of this invention will be apparent from the following description and claims in which there is found the manner of making and using the invention in the best mode contemplated by the inventor for carrying out the invention.

Drawings accompany this disclosure and the various views thereof may be briefly described as:

FIG. 1, a first cavity configuration for a solid state laser light source which operates in a single transverse and axial mode.

FIG. 2, a second cavity configuration for a solid st ate laser light source which operates in a single transverse and axial mode.

FIG. 3, a first modification of the end mirrors of the cavity configuration of FIG. 2.

FIG. 4, a second modification of the end mirrors of the cavity configuration of FIG. 2.

FIG. 5, a third modification of the end mirrors of the cavity configuration of FIG. 2.

REFERRING TO THE DRAWINGS

FIGS. 1 and 2 disclose two general cavity configurations for operating a pulsed solid-state laser in a single axial and transverse mode. In both figures a convex mirror 10, a solid-state laser rod 12, a saturable absorber 14, an aperture 16 and a concave mirror 18 are shown aligned in various positions on a common optical axis. By a common optical axis, it is meant that the various components are positioned or aligned so that a wave or ray of light will be transmitted through or reflected from one component to another in succession. A flash coil (not shown) is used to pump the laser rod 12. In both figures, the convex mirror 10 is highly (approximately 98 percent) reflective for the particular band of light that is produced by the solid state laser and the concave mirror 18 both reflects and transmits a portion of the light from the laser rod. In the preferred embodiment of both cavity configurations, the concave mirror 18 reflects approximately 50 percent of the light.

In the configuration of FIG. 1, there are two optical Fabry-Perot interference filters or etalons 20, 22. The etalon 20 is comprised of two optical flats with an air space between them. One surface of each optical flat is coated with a dielectric material to provide a partially reflective surface. The etalon 22 is composed of a single piece of optical glass with the difference in the refractive index between the glass and the surrounding air providing a reflective surface. In the preferred embodiment of all figures, the reflective surfaces of the etalons are flat to within 0.1 of a wavelength at 5890 angstroms or of a sodium vapor light source and are parallel to each other within 2 seconds of an arc. Both the etalons 20 and 22 act as band-pass filters and eliminate all but one of the longitudinal modes of oscillation of the light wave from the laser cavity. The attenuation and the shape of the bandpass of the etalons is controlled by the reflectivity of the surfaces. The etalons are tilted slightly with respect to each other and with respect to the laser axis to eliminate resonances between the etalon surfaces and the end mirror surfaces of the laser cavity. Tilting the etalons also tunes the band-pass peaks of the filters so that the filter peaks are nearly coincident with the single axial mode that is near the peak of the ruby gain curve.

The dielectric coating used in the optical filter or etalon 20 is susceptible to damage due to the comparatively high energy of the light beam that is produced by the pulsed solid-state laser. Therefore, the cavity configuration shown in FIGS. 2, 3, 4 and 5 which utilizes only a single optical filter or etalon 24 is the preferred configuration for operating a pulsed solid-state laser in a single axial and transverse mode. The etalon 24 is composed of a single optical flat, the surfaces of which are not coated with any dielectric material. A material for the optical flat of the etalon 24 is selected which provides a sufficient difference between the refractive index of the material and air to provide the desired bandpass or interference characteristics for the optical filter 24. A suitable material for this purpose is high density flint glass or high quality saphire.

In the referred embodiment of this invention, the surface of the etalon 24 are flat within 0.1 of a wave length at 5890 angstroms or of a sodium vapor light source and parallel to each other within 2 seconds of an arc. The use of a single uncoated etalon 24 allows the cavity configuration of FIGS. 2, 3, 4 and 5 to have a higher power output than the configuration of FIG. 1 without damaging the optical filters or etalons or the other components of the cavity. Like the combinations of filters 20, 22 in the configuration of FIG. 1, the filter 24 in FIGS. 2, 3, 4 and 5 eliminates all but one of the longitudinal modes of oscillation of the light wave from the solid-state laser.

In the configuration of FIGS. 2, 3, 4 and 5, it is sometimes possible to remove the etalon 24 and operate the pulsed laser rod 12 in a single axial mode for a short period of time. However, for a prolonged stable single axial mode of operation, it is necessary to utilize an optical filter or etalon 24 in the cavity of FIGS. 2, 3, 4 and 5. In both configurations the peaks of the bandpasses are tuned to a particular longitudinal mode by adjusting the angular relationship of the filter to the laser rod.

In FIGS. 1 and 2, both the convex 10 and the concave 18 mirrors are spherical, relatively long radius mirrors. A relatively long radius mirror is one in which the radius of the reflective surface is in the range of approximately 1 to 40 meters. The mirrors 10 and 18 are positioned within the cavity on either side of the laser rod 12 so that light is reflected between the mirrors and through the laser rod. The mirrors 10, 18 are positioned so that their centers of curvature are proximate to each other and in the preferred embodiment of this device the mirrors are arranged in the cavity so that the center of curvature of the concave mirror falls between the center of curvature of the convex mirror and the convex mirror itself. In this arrangement, the center of curvature of the mirrors 10, 18 is close to a concentric configuration. An illustrative specific embodiment of the mirrors in the cavity is the positioning of a spherical concave mirror with a radius of 4.7 meters, one meter away from a convex spherical mirror of 4 meters so that the center of curvature of the concave mirror would be 0.3 of a meter from the center of curvature of the convex mirror and positioned between the convex mirror and the center of curvature of the convex mirror.

In both configurations, the saturable absorber 14 is used to control both the pulsing of the laser rod and as a filter for eliminating all but one of the transverse modes of oscillation of the light from the laser. Such saturable absorbers are well known in the pulsed laser art and are composed of a suitable container with transparent apertures which is filled with an absorbing dye which becomes transparent upon the absorption of sufficient energy. A suitable dye for this purpose is cryptocyanine. In both cavity configurations, the apertures 16 also suppresses higher order transverse modes. However, selection of the fundamental transverse mode is primarily accomplished by the relative position and arrangement of the etalons, ruby rod and saturable absorber which provides a lower cavity loss to the fundamental mode than to higher order transverse modes. The suppression of the higher order transverse modes improves the stability of the laser output. A suitable aperture for this purpose is one whose diameter is about equal to the diameter of the fundamental transverse mode of the light beam measured at the exit end of the cavity. It is possible to use either convex mirror 10 or concave mirror 18 as the exit mirror or exit end of the cavity configuration. The cavity configuration of FIGS. 2, 3, 4 and 5 will also operate in a single transverse and axial mode when the aperture 16 is positioned between the saturable absorber 14 and the end mirror 18.

FIGS. 3, 4 and 5 illustrate cavity configurations with various combinations of convex, concave and flat end mirrors, all of which have the preferred arrangement of laser rod 12, etalon 24, aperture 16 and saturable absorber 14. FIG. 3 illustrates the use of two concave long radius end mirrors 24 and 26 to provide a path to send photons of light through laser rod 12. The concave surfaces of mirrors 24 and 26 tend to focus the beam of light emitted from laser 12 to control its transverse mode diameter. FIG. 4 illustrates the use of a long radius concave end mirror 28 and a plane end mirror 30 to provide a path for the photons of light. Concave mirror 28 primarily controls the scattering and hence the transverse mode diameter beam of the light from laser 12. FIG. 5 illustrates a cavity configuration with two flat or plane end mirrors 30 and 32. In this configuration the transverse mode diameter is controlled primarily by the so-called lens effect of laser rod 12. Due to thermal distortion from operation of the laser rod, its end surfaces become distorted or curved so that the rod and flat mirrors 30, 32 together act like a cavity with a concave mirror. The maximum energy output of a laser rod is at least partially dependent on the transverse mode diameter of its output which is limited by the maximum cylindrical volume of the rod which is sufficiently optically homogeneous to allow the rod to operate in a single transverse mode. Hence to derive the maximum energy output from any particular rod, it is necessary to experimentally vary the curvature of the mirrors slightly to determine the maximum mode diameter and hence maximum volume at which the particular rod will still have a stable single transverse mode of operation.

In the preferred configuration for operation of the pulsed laser 12 in a single transverse and axial mode the saturable absorber 14 and the laser rod 12 are placed at opposite ends of the cavity, the aperture 16 is interposed between the laser 12 and the saturable absorber 14 adjacent to the saturable absorber, and the etalon 24 is interposed between laser rod 12 and aperture 16 as shown in FIGS. 2, 3, 4 and 5. With this arrangement the power output of the laser light source can be materially increased. A suitable theoretical explanation for the material increase in the power output of the configuration of FIGS. 2, 3, 4 and 5, over that of FIG. 1, is not presently known.

What I claim as new is as follows:

1. A cavity configuration for a solid-state laser which comprises; a first mirror, a second mirror oriented with respect to said first mirror so that both mirrors reflect light toward each other, at least one of said mirrors having a radius of curvature in the range of 1 to 20 meters, a solid-state laser rod interposed between said mirrors and aligned with respect to said mirrors so that a beam of light reflected between the mirrors passes through said laser rod substantially parallel to its longitudinal axis, a saturable absorber interposed between said laser rod and one of said mirrors, at least one etalon interposed between said laser rod and one of said mirrors, and an aperture interposed between said laser rod and one of said mirrors with said mirrors, laser rod, saturable absorber, aperture and etalon sharing a common optical axis so that a beam of light reflected between said mirrors will pass through said laser rod, saturable absorber, aperture and etalon.

2. A cavity configuration for a solid-state laser as defined in claim 1 in which the saturable absorber is positioned adjacent to one of the mirrors, the aperture is positioned adjacent to the saturable absorber, an etalon is positioned adjacent to the aperture, the solid-state laser rod is positioned adjacent to the etalon and the other mirror is positioned adjacent to the solid-state laser rod.

3. A cavity configuration for a solid-state laser as defined in claim 1 in which the first mirror is convex and the second mirror is concave and both mirrors have a radius of curvature in the range of 1 to 20 meters and are arranged in the cavity so that the center of curvature of the concave mirror is proximate to the center of curvature of the convex mirror.

4. A cavity configuration for a solid-satate laser as defined in claim 3 in which the center of curvature of the concave mirror is between the center of curvature of the convex mirror and the convex mirror itself whereby the center of curvature of both mirrors is close to a concentric configuration.

5. A cavity configuration for a solid-state laser as defined in claim 1 in which the diameter of the aperture is approximately equal to the diameter of the fundamental transverse mode of the light beam emitted by the solid-state laser from the cavity measured at the exit to the cavity.

6. A cavity configuration for a solid-state laser as defined in claim 1 in which the diameter of the aperture is approximately equal to the diameter of the fundamental transverse mode of the light beam emitted by the solid-state laser from the cavity measured at the exit to the cavity.

7. A cavity configuration for a solid-state laser as defined in claim 3 in which the radius of the concave mirror is approximately 4.7 meters, the radius of the convex mirror is approximately 4 meters and the center of curvature of the concave mirror is approximately 0.3 of a meter from the center of curvature of the convex mirror.

8. A cavity configuration for a solid-state laser as defined in claim 1 in which both said first and second mirrors are curved, the radius of each mirror is within the range of 1 to 20 meters, and the centers of curvature of the mirrors are within one meter of each other.

9. A cavity configuration for a solid-state laser as defined in claim 1 in which both the first and second mirrors are concave.

10. A cavity configuration for a solid-state laser as defined in claim 8 in which both the first and second mirrors are concave.

11. A cavity configuration for a solid-state laser as defined in claim 1 in which the first mirror is concave and the second mirror is flat.

12. A cavity configuration for a solid-state laser as defined in claim 2 in which the first mirror is concave and the second mirror is flat.